United States Patent
Kotab et al.

(10) Patent No.: US 8,953,032 B1
(45) Date of Patent: Feb. 10, 2015

(54) SELF ARTICULATING BEHIND-WALL CAMERA

(71) Applicants: Dominic M. Kotab, San Jose, CA (US); Jarrod Hicks, San Jose, CA (US)

(72) Inventors: Dominic M. Kotab, San Jose, CA (US); Jarrod Hicks, San Jose, CA (US)

(73) Assignee: Dominic M. Kotab, San Jose, CA (US)

( * ) Notice: Subject to any disclaimer, the term of this patent is extended or adjusted under 35 U.S.C. 154(b) by 0 days.

(21) Appl. No.: 14/024,489

(22) Filed: Sep. 11, 2013

Related U.S. Application Data (63) Continuation of application No. 12/404,116, filed on Mar. 13, 2009, now Pat. No. 8,558,882.

(60) Provisional application No. 61/036,820, filed on Mar. 14, 2008.

(51) Int. Cl.
*H04N 3/36* (2006.01)
*H04N 7/18* (2006.01)

(52) U.S. Cl.
CPC ..................... *H04N 7/18* (2013.01)
USPC ................. 348/82; 348/83; 395/27

(58) Field of Classification Search
USPC .......................... 348/82, 83; 395/1
See application file for complete search history.

(56) References Cited

U.S. PATENT DOCUMENTS

| | | | |
|---|---|---|---|
| 7,801,425 B2* | 9/2010 | Fantone et al. | 396/27 |
| 8,558,882 B1 | 10/2013 | Kotab et al. | |
| 2007/0135803 A1* | 6/2007 | Belson | 606/1 |
| 2010/0220182 A1* | 9/2010 | Krull et al. | 348/83 |

OTHER PUBLICATIONS

Non-Final Office Action from U.S. Appl. No. 12/404,116 dated Feb. 27, 2013.
Notice of Allowance and Fee(s) Due from U.S. Appl. No. 12/404,116 dated Jun. 10, 2013.

* cited by examiner

*Primary Examiner* — Tammy Nguyen (57) ABSTRACT

In one general embodiment, a system for viewing partially or fully enclosed areas comprises a camera coupled to a first end of an elongated member and at least one interface for communicating with a viewing device. The system also includes a controller coupled to a second end of the elongated member for controlling at least one of the member, the camera, and the viewing device, wherein the elongated member has a cross sectional area of less than about one square inch at a point toward the first end of the elongated member. Additional systems and methods are also presented.

30 Claims, 7 Drawing Sheets

SELF ARTICULATING BEHIND-WALL CAMERA

RELATED APPLICATIONS

This application is a continuation of U.S. patent application Ser. No. 12/404,116, filed on Mar. 13, 2009 and entitled "Self Articulating Behind-Wall Camera," which claims priority to U.S. Provisional Patent Appl. No. 61/036,820, filed on Mar. 14, 2008 and entitled "Self Articulating Behind-Wall Camera," the contents of both are herein incorporated by reference.

FIELD OF THE INVENTION

The present invention relates to cameras, and more specifically this invention relates to cameras that can view behind walls.

BACKGROUND

Whenever performing work that requires walls to be pierced, cut into, or demolished, it is of particular need to know what is behind the wall and where items therebehind are placed. If this information is not known, damage to electrical and support members and even plumbing may result from performing home renovations and alterations. The wall could be cut into, with a panel of the wall removed to allow visual inspection of the contents of the wall directly behind the work area. However, in many projects, removal of wall sections is not an acceptable means for viewing what is behind a wall. Therefore, there is a need to reduce the uncertainty relating to structures, items and/or equipment behind walls of a structure such as a house while avoiding removal of large segments of the walls.

SUMMARY OF THE INVENTION

In one general embodiment, a system for viewing partially or fully enclosed areas comprises a camera coupled to a first end of an elongated member and at least one interface for communicating with a viewing device. Also, the system includes a controller coupled to a second end of the elongated member for controlling at least one of the member, the camera, and the viewing device, wherein the elongated member has a cross sectional area of less than about one square inch at a point toward the first end of the elongated member.

In another general embodiment, a system comprises a photo lens coupled to a first end of an elongated member and an image capture device operatively coupled to the photo lens. Also, the system includes at least one interface for communicating with a viewing device, wherein the elongated member has a cross sectional area of less than about one square inch at a point toward the first end of the elongated member.

In another general embodiment, a method for viewing a fully or partially enclosed area comprises capturing at least one image from behind an obstruction using an image capture device operatively coupled to a photo lens coupled to a first end of an elongated member and outputting the at least one image captured by the image capture device to a viewing device. Additionally, the elongated member has a cross sectional area at a point toward the first end of the elongated member of less than about one square inch.

Other aspects, advantages and embodiments of the present invention will become apparent from the following detailed description, which, when taken in conjunction with the drawings, illustrate by way of example the principles of the invention.

For a fuller understanding of the nature and advantages of the present invention, as well as the preferred mode of use, reference should be made to the following detailed description read in conjunction with the accompanying drawings.

DETAILED DESCRIPTION

The following paragraphs describe certain features and combinations of features that can be used in connection with the invention and each embodiment, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation including meanings implied from the specification as well as meanings understood by those skilled in the art and/or as defined in dictionaries, treatises, etc. The following description discloses several preferred embodiments of a behind wall camera system, as well as operation and/or component parts thereof.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

In one general embodiment, a system for viewing partially or fully enclosed areas comprises a camera coupled to a first end of an elongated member; a viewing device operatively coupled to the camera; a controller coupled to a second end of the elongated member for controlling at least one of the member, the camera, and the viewing device, wherein the elongated member has a cross sectional area of less than about one square inch at a point toward the first end of the elongated member.

In another general embodiment, a system comprises a photo lens coupled to a first end of an elongated member, an image capture device operatively coupled to the photo lens; a viewing device operatively coupled to the camera, wherein the elongated member has a cross sectional area of less than about one square inch at a point toward the first end of the elongated member.

In another general embodiment, a method for viewing a fully or partially enclosed area comprises drilling a hole through a wall; inserting a first end of an elongated member through the hole in the wall, wherein the first end of the elongated member is coupled to a photo lens; and positioning the photo lens such that an image capture device operatively coupled to the photo lens captures a desired view behind the wall.

In another general embodiment, a method for viewing a fully or partially enclosed area comprises capturing at least one image from behind an obstruction using an image capture device operatively coupled to a photo lens coupled to a first end of an elongated member; and outputting the at least one image captured by the image capture device to a viewing device, wherein a center of view of the photo lens is between about 45 degrees and about 135 degrees relative to a longitudinal axis of the elongated member, wherein the elongated member has a cross sectional area at a point toward the first end of the elongated member of less than about one square inch.

In one embodiment of the invention, and described generally with reference to FIGS. 1A-3B, a system may be used to view a fully or partially enclosed area, such as behind a wall 128, above a ceiling, under a floor, etc. Now referring to FIG. 1A, in one embodiment, a system 100 includes a camera 102 which is coupled to a first end 110 of an elongated member 104, such as a deformable, flexible (resiliently deformable), semi-rigid or rigid tube, cable, solid member, etc. The elongated member 104 may be self-articulating. As an option, the elongated member 104 may be coated with a polymer to protect it from damage. Various couplings may be present in or along the elongated member 104, such as a power cable 106 and/or a first data cable 108 for powering and sending/receiving data to/from the camera 102.

Figure 1A:
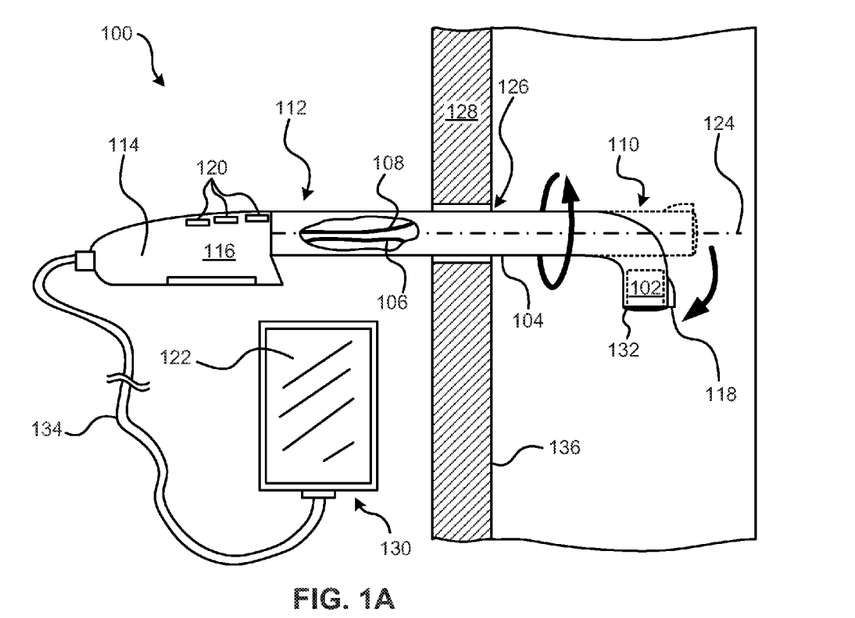
FIGS. 1A-1F show several embodiments of a system for viewing a partially or fully enclosed area.

The elongated member 104 may be formed of one or more of several different types of materials. For example, the elongated member 104 may be at least partially formed of a rigid material, such as a metal, thermoplastic, ceramic, etc., which is not resiliently deformable. In another example, the elongated member 104 may be at least partially formed of a semi-rigid material, such as thermoplastics which are linked together by deformable sections or connectors (such as hinges, joints, etc.), metal portions which are linked together by deformable sections or connectors (such as hinges, joints, etc.), etc.

The camera 102 generally includes a photo lens 132 for collecting light to be interpreted by components of the camera 102. In some other embodiments, an image capture device may be used with a photo lens 132, where the photo lens 132 and image capture device may be included in a single structure, or may be operatively coupled by a light guide, such as fiber optics, a mirror, digital cable, analog cable, etc.

In some embodiments, the elongated member 104 may include a motor, a flexible portion, a hinge, a joint, and/or a servomechanism for positioning a portion or the entire elongated member 104. For example, a ball and socket joint may be used to couple the first end 110 of the elongated member 104 to the second end 112 of the elongated member 104, thereby allowing positioning of the first end 110 of the elongated member 104, e.g., by manual- and/or self-articulation of the first end 110. In another example, a hinge may be used to couple portions of the elongated member 104 together, thereby providing for a greater range of movement than a single joint normally can provide. Several embodiments described herein include at least one of these components. For example, in FIG. 1A, the elongated member 104 includes a flexible portion for positioning of the elongated member 104, and thereby positioning of the camera 102 and/or photo lens 132, such that a desirable view may be captured by the camera 102 and/or image capture device.

At a second end 112 of the elongated member 104, in this embodiment, is a controller 114, possibly encompassed in a base unit 116 which may include more components to control the camera 102, an optional light source 118, and/or the elongated member 104. In some embodiments, the controller 114 may include controls 120 to toggle power to the camera 102, viewing device 122, and/or the optional light source 118. In addition, the controller 114 may include controls 120 to zoom the camera 102, controls to adjust focus, controls to capture images, etc. Of course, any of these controls 120 may be included on an external viewing device 130.

A controller 114 may be any device, circuit, processor, etc. which alters, changes, receives, transmits, manipulates or otherwise affects a signal, action, feature, and/or parameter of any component of the system 100. For example, a controller 114 may be a simple device, such as a circuit which provides power to the system 100 and/or transmits data from the camera 102 to the viewing device. In addition the controller 114 may be a complex device, such as a control algorithm programmed into a control system which can control various functions of the system 100. Some functions of the system 100 which may be controlled by the controller 114 include toggling power to the camera 102, rotating the elongated member 104, zooming the camera 102 and/or photo lens 132, positioning the elongated member 104, focusing the photo lens 132, toggling power to the light source 118, dimming the light source 118 (possibly automatically to account for image clarity and brightness accommodation in enclosed viewing areas), adjusting viewing options, etc. Many more features and aspects of the system 100 may be controlled using the controller 114, and this list is not fully inclusive or limiting in any way.

According to some embodiments, the elongated member 104 may be capable of being manipulated using the controller 114, possibly through manipulation of control buttons, switches, toggles, sliders, etc. Of course, these controls may be located on an external viewing device 130, such as a PDA, mobile telephone, laptop computer, etc., or on the base unit 116 including the controller 114. In some preferred embodiments, the controller 114 may further comprise a connection to a power source. For example, the power source may be one or more batteries (disposable and/or rechargeable), a standard AC wall outlet, a USB connection to a computer (such that the system 100 may be powered through the USB connection), etc.

According to some approaches, the first end 110 of the member 104 may include a light source 118 powerful enough to illuminate the area in front of the photo lens 132 up to about 10 feet away in total darkness, and which moves with the first end 110 of the elongated member 104 to point in the direction which the photo lens 132 is viewing. This light source 118 may be turned on and off from the base unit 116 or an external viewing device 130, through a control, and may be a light source capable of several different power settings, which may be controlled through another control or the same control button which turns the light source 118 on and off. For example, this may be accomplished with the following scheme: pressing the button once turns the light source on, another button press dims the light source, another button press dims the light source further, and another button press turns the light source off.

In some more approaches, the light source 118 may have its own power cable housed inside or along the elongated member 104, or may share the power cable for the camera 102 and/or photo lens 132. Illustrative light sources include incandescent light bulbs, light-emitting diodes (LED), fiber optic lights, organic light-emitting diodes (OLED), etc.

In some embodiments, a power cable 106 may be included internal to or along an outside of the elongated member 104 for providing power to the camera 102 and/or light source 118. The power cable 106 may be terminated in the base unit 116, and may be powered by an electrical cord attached to the base unit 116 capable of being plugged into a standard AC power socket, or may be powered by sufficient commercially available batteries, such as AAA batteries, AA batteries, C batteries, etc. The batteries may be of a rechargeable type, or disposable. If the batteries are rechargeable, a removable power cord may be coupled to the system 100, e.g., the base unit 116, which, when plugged into a standard US power socket, recharges the batteries for future use. The system 100 may also be capable of being run off of this power cord in the absence of batteries.

In some more embodiments, the system 100 may be powered by a USB connection, wherein the USB may be powered by an attached computer, such as a PDA, mobile telephone, BLACKBERRY, iPHONE, laptop computer, etc.

A first data cable 108 may couple the base unit 116 to the camera 102, in some embodiments. This first data cable 108 may be included internal to or along an outside of the elongated member 104 for capturing information transmitted from the camera 102 to the controller 114, for viewing on a viewing device 122. The first data cable 108 may also provide commands for controlling the several functions of the camera 102, such as powering on/off, zooming, focus, image capture, etc.

According to some embodiments, the base unit 116 may be capable of being attached to an external viewing device 130 through standard or proprietary wireless and/or wired data connections, such as USB, analog video connection, Wi-Fi, Bluetooth, firewire, etc. A second data cable 134, which may be removable, may extend from the base unit 116 in a convenient length such as 4.5 feet, 3 feet, 18 inches, etc., such that the second data cable 134 can be connected to an external viewing device 130. An external viewing device 130 may include a digital camera, a video camera, a mobile phone capable of displaying video, an APPLE IPOD, an APPLE iPHONE, an MP3 player with video capability, a laptop computer, etc. Standard connections may include USB 1.2, USB 2.0, firewire, etc. In addition, BLUETOOTH, Wi-Fi, or any other wireless technology may be used to transmit data to an external viewing device 130 capable of receiving such wireless data. Accordingly, the second data cable 134 may not be needed in some embodiments which use wireless technologies. Generally, any external viewing device 130 includes a viewing device 122.

Storage media, such as flash memory or other portable memory, RAM, DRAM, CD-ROM, DVD-ROM, a hard disk drive, etc., may be operatively coupled to the camera 102 and/or image capture device, according to some embodiments, such that images captured by the camera 102 and/or image capture device may be stored on the storage media for viewing at a later time, transferring to other devices, uploading, generation of physical pictures, etc.

Also, in some embodiments, the controller 114 may be included in an external viewing device 130 which may include a viewing device 122, in the base unit 116 which may or may not include a viewing device 122, in the elongated member 104, etc.

With continued reference to FIG. 1A, in one approach, the elongated member 104 may be selectively positioned such that a center of a view of the photo lens 132 and/or camera 102 may be at an angle of between 0 degrees and about 135 degrees relative to a longitudinal axis 124 of the elongated member 104. In a further approach, the elongated member 104 may be selectively positioned such that a center of a view of the photo lens 132 and/or camera 102 may be at an angle of between 0 degrees and about 90 degrees relative to a longitudinal axis 124 of the elongated member 104. In FIG. 1A, the camera 102 and/or photo lens 132 is positioned at an angle of about 90 degrees relative to the longitudinal axis 124, but any angle between 0 degrees and about 135 degrees may be possible.

In some preferred embodiments, a center of a view of the photo lens 132 and/or camera 102 may be oriented between about 45 degrees and about 135 degrees relative to a longitudinal axis 124 of the elongated member 104.

As noted above, the constitution of the elongated member 104 in some embodiments may be deformable, flexible (resiliently deformable), semi-rigid, rigid, etc. and combinations thereof. Moreover, in some embodiments, the elongated member 104 may comprise a tube, a cable, a solid member e.g., of injection molded plastic with optional channels therethrough or therealong, etc., and combinations thereof.

In addition, in some embodiments, the elongated member 104 may be rotatable about the longitudinal axis 124 of the elongated member 104 relative to the viewing device 122. This may allow for the camera 102 and/or photo lens 132 to be selectively positionable in one direction, while the rotation of the elongated member 104 may allow viewing of many other directions. For example, to view upwardly, the elongated member 104 may be positioned as shown in FIG. 1A, and then the elongated member 104 may be rotated 180 degrees, such that the first end 110 of the elongated member 104 faces upward.

In some embodiments, a cross sectional area of the elongated member 104 toward the first end 110 of the elongated member 104 may be less than about 2 square inches, alternatively less than about 1.5 square inches, alternatively less than about 1 square inch, alternatively less than about 0.75 square inch, alternatively less than about 0.5 square inch, alternatively less than about 0.25 square inch, etc., but could be larger or smaller. In more embodiments, the cross section may be rectangular, elliptical, triangular, circular, hexagonal, etc. A circular cross section may be preferred so that a typical drill may be used to drill a hole 126 in a wall 128 or obstruction prior to inserting the elongated member 104 into the hole 126.

In some more embodiments, the cross sectional area of the elongated member 104 may be less than about 2 square inches, alternatively less than about 1.5 square inches, alternatively less than about 1 square inch, alternatively less than about 0.75 square inch, alternatively less than about 0.5 square inch, alternatively less than about 0.25 square inch, etc., at a point passing through the hole 126 in the wall 128 or obstruction.

The photo lens 132, according to some embodiments, may be a standard lens, a wide angle lens, or an ultra-wide angle lens, such as a fisheye lens, to allow for greater viewing angle behind the wall 128 or obstruction. Specifically, the photo lens 132 may be capable of viewing distances of between about 1 inch and about 10 feet, with automatic and/or manual adjustment of the focus and zoom.

According to some more embodiments, a distance estimating device for estimating a distance from a longitudinal axis 124 of the elongated member 104 to an object in a view of the camera 102 and/or photo lens 132 may be included. Illustrative distance estimating devices include a laser range finder, sonic range finder, etc. This distance estimating device may be especially useful for generating a positional drawing of items hidden behind a wall or some other obstruction. For example, a contractor may use this feature to determine distances from a position on the wall such that any cutting, drilling, demolishing, etc., may be conducted safely and without harm to components of the house.

According to some embodiments, one control button may cause the elongated member to bend about 90 degrees so that the camera faces perpendicular to the longitudinal axis of the elongated member at a distance of between about 1 inch and about 3 inches from the first end of the elongated member. This button may bend the first end of the elongated member as long as the button is pressed. Once about 90 degrees of bend is reached, the elongated member will stop bending. Then pressing and holding the button will cause the elongated member to bend back to a straight (about 0 degree) position. In this embodiment, the camera may be positioned in any position between about 0 degrees and about 90 degrees, depending on how long the button is depressed.

Figure 1B:
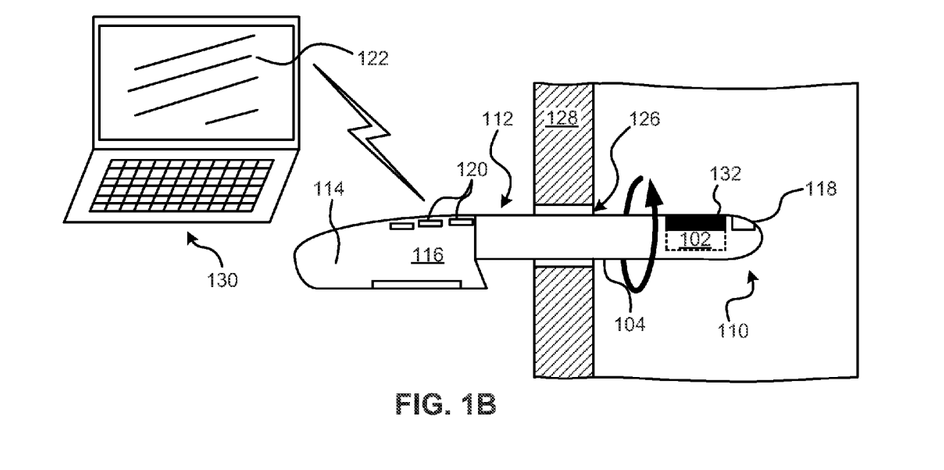

Now referring to FIG. 1B, another embodiment is shown. In this embodiment, an external viewing device 130 such as a laptop computer, includes a viewing device 122 and is connected to the controller 114 in the base unit 116 through a wireless technology, such as BLUETOOTH, Wi-Fi, etc. The elongated member 104 includes a camera 102 positioned at the first end 110 of the elongated member 104, along with a light source 118. The elongated member is rotatable, such that a view of the camera 102 can rotate 360 degrees behind the wall 128.

In yet another embodiment, the camera 102 and optional light source 118 may be positioned about 90 degrees to a longitudinal axis 124 of the elongated member 104, so that when the elongated member 104 is inserted into the wall 128, the camera 102 may be aimed into the space behind the wall 128, not toward the other side of the wall. This embodiment does not require the elongated member 104 to bend 90 degrees, although such functionality may still exist to adjust the camera 102 viewing position.

Figure 1C:
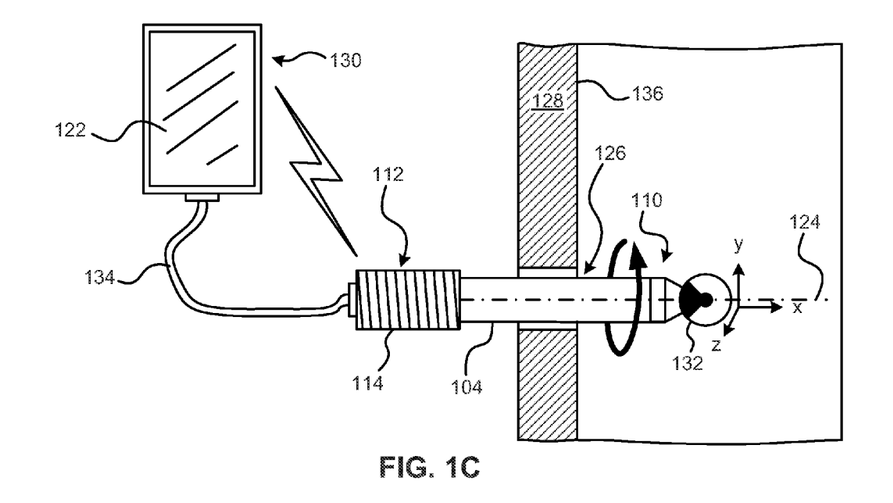

With reference to FIG. 1C, another embodiment is shown for viewing a partially or fully enclosed area. In this embodiment, a photo lens 132 is positioned toward the first end 110 of the elongated member 104, such that a view of the photo lens 132 is behind the wall 128. In this embodiment, the photo lens 132 is capable of rotating independent of the elongated member 104, and can rotate between about −135 degrees to about 135 degrees relative to the x-axis (a longitudinal axis 124 of the elongated member 104) in the y-axis and z-axis planes, thereby allowing the photo lens 132 to view angles of the interior surface 136 of the wall 128. In addition, the elongated member 104 may rotate about a longitudinal axis 124 of the elongated member 104.

With continued reference to FIG. 1C, an external viewing device 130 is operatively coupled to the controller 114 via a second data cable 134. In addition, the external viewing device 130 may be operatively coupled to the controller 114 via a wireless connection such as Wi-Fi, BLUETOOTH, RF, etc.

Moreover, in some embodiments, the external viewing device 130 and/or controller 114 may send images and/or video to a remote device via a wired or wireless connection to a network such as a local area network, a wide area network such as the internet, telephone network, etc.

Figure 1D:
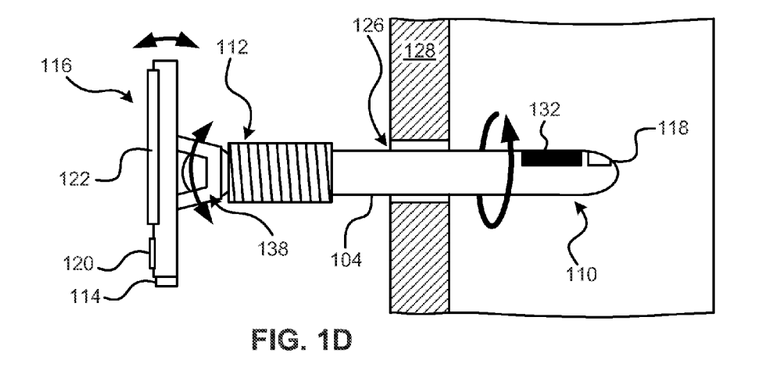

In FIG. 1D, another embodiment for viewing a partially or fully enclosed area is shown. The base unit 116 includes a viewing device 122 and controls 120 for controlling functions of the system. The base unit 116 is mounted on a ball and socket joint 138, such that it may be rotated and angled for easier viewing from different angles. Any other type of coupling may be used to allow for movement to allow for easier viewing of the viewing device 122.

Figure 1E:
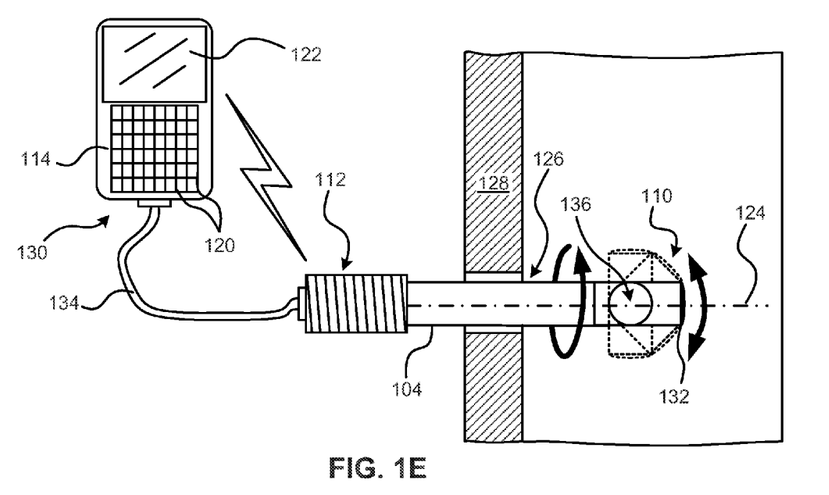

With reference to FIG. 1E, another embodiment for viewing a partially or fully enclosed area is shown. The external viewing device 130 is a mobile telephone, such as a BLACKBERRY device, which includes a viewing device 122 and is capable of displaying images received through a connection with a controller 114. Of course, in some embodiments, the controller 114 may be included in the external viewing device 130 such that the information sent through the connection is only electronic information as determined by an image capture device included with the system. In this embodiment, the photo lens 132 is selectively positionable via a hinge 136, which allows for a center of a view of the photo lens 132 to be positioned between about −135 degrees and about 135 degrees relative to a longitudinal axis 124 of the elongated member 104. Of course, since the elongated member 104 is rotatable, the photo lens 132 may be positionable in one direction, instead of in two or more directions, and still have the ability to capture the same images as if it moved in both directions.

Figure 1F:
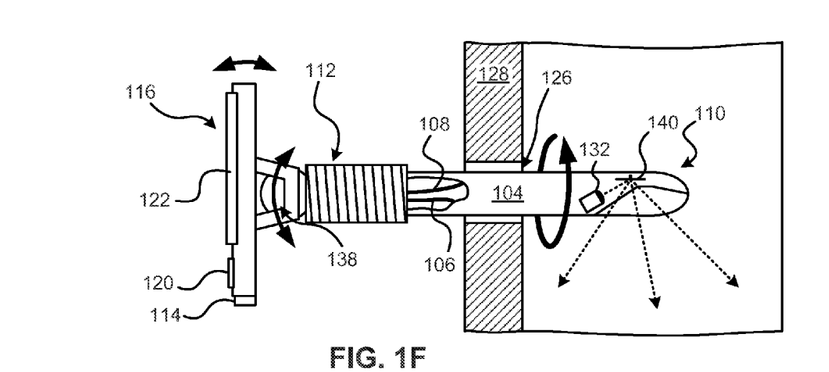

Now referring to FIG. 1F, another embodiment for viewing a partially or fully enclosed area is shown. Here, a camera and/or photo lens 132 may be stationary while a mirror 140 is selectively positionable. In this fashion, a center of a view of the photo lens 132 may be positioned in many varied directions, allowing for any desired view to be observed behind the wall 128 or obstruction. The positioning of the mirror 140 may be controlled with the controller 114, with the base unit 116, or with some other device, such as an external viewing device. Moreover, upon rotating the elongated member 104, the image output on the viewing device 122 may rotate with the device and/or may be self-rotating and/or manually rotatable.

Figure 2A:
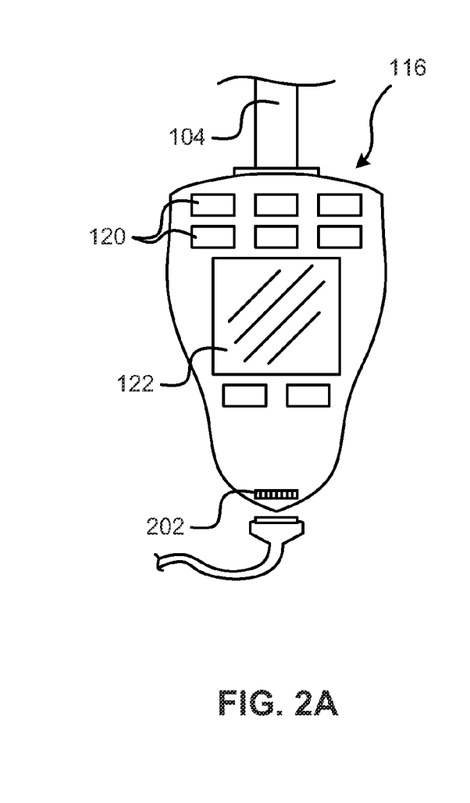
FIGS. 2A-2C show several embodiments of a base unit.
Figure 2B:
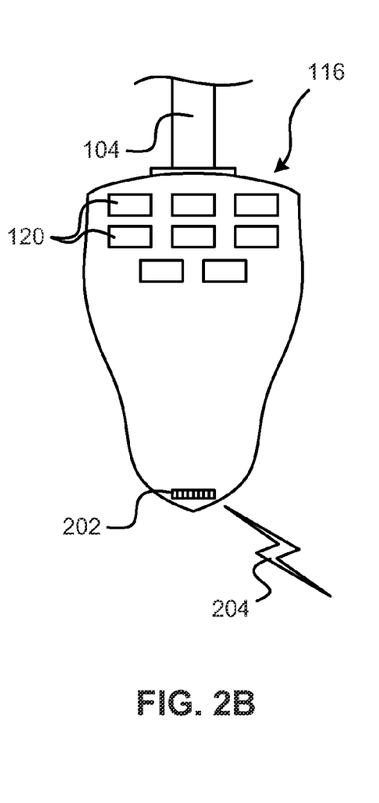
Figure 2C:
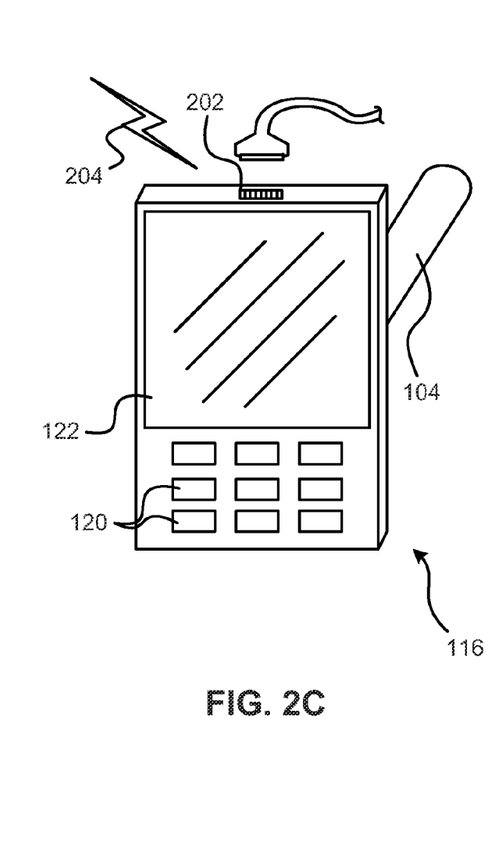

Now referring to FIGS. 2A-2C, a base unit 116 is shown according to several embodiments. In FIG. 2A, the base unit 116 includes a viewing device 122 and controls 120 for controlling functions of a system. The base unit 116 also includes a data connection port 202, such as a USB port, Firewire port, serial port, etc., for connecting to an external viewing device. The base unit 116 may include a controller. The elongated member 104 is coupled near the top end of the base unit 116.

In FIG. 2B, the base unit 116 is shown without a viewing device. The base unit 116 includes a wireless connection 204, such as Wi-Fi, BLUETOOTH, etc., for connecting to an external viewing device. In addition, the base unit 116 is contoured to fit naturally in a user's hand. The base unit 116 may include a controller. The elongated member 104 is coupled near the top end of the base unit 116.

In FIG. 2C, a more conventional base unit 116 is shown with about square edges and a rectangular shape. The base unit 116 includes a viewing device 122 and may include a controller. The elongated member 104 is coupled near a back of the base unit 116. The base unit 116 may include an adjustable coupling to the elongated member 104, such that viewing the base unit 116 may be easier from different viewing angles once the base unit 116 has been adjusted.

Figure 3A:
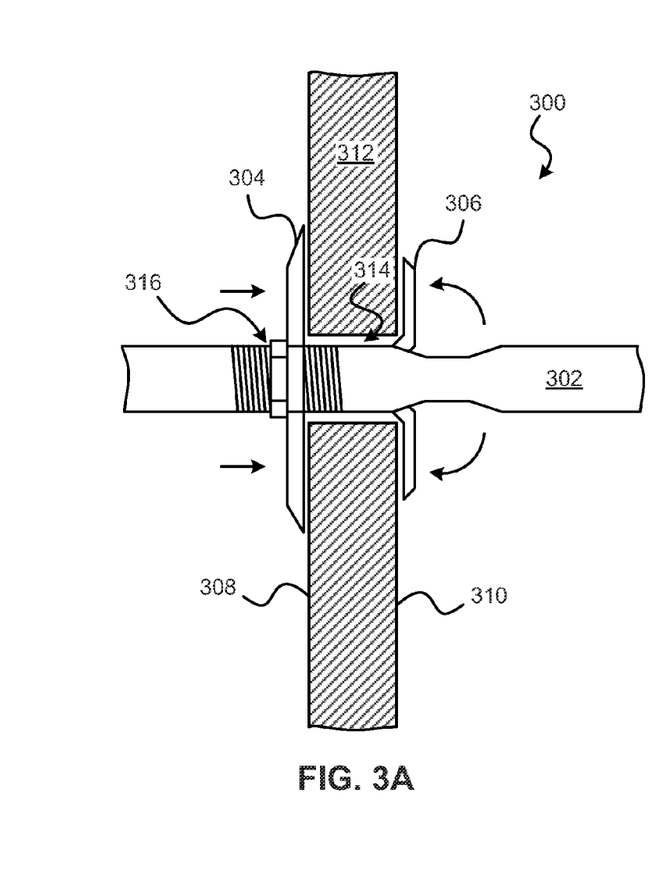
FIGS. 3A-3B show several embodiments of a clamping mechanism.
Figure 3B:
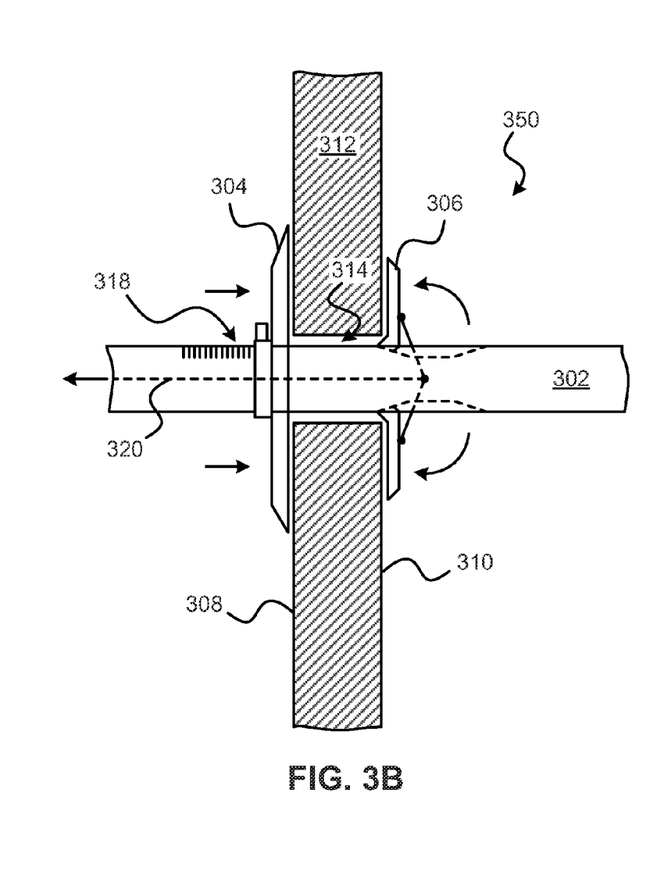

Now referring to FIGS. 3A and 3B, a clamping mechanism, which may or may not be included with any of the systems for viewing a partially or fully enclosed area, is described according to several embodiments. The clamping mechanism may be used to couple the elongated member 302 to a wall 312 or obstruction.

In FIG. 3A, a clamping mechanism 300 which may be positioned along the elongated member 302, includes two clamps. The first clamp 304, positioned on an exterior surface 308 of the wall 312, may be adjustable and/or selectively positionable along the elongated member 302. The second clamp 306 may be positioned on an interior surface 310 of the wall 312. In addition, the second clamp 306 may be spring-loaded, adjustable, and/or retractable, such that the portions of the second clamp 306 which protrude from the elongated member 302 do not interfere with the insertion of the elongated member 302 through a hole 314 in the wall 312. As shown in FIG. 3A, the first clamp 304 is positionable via a threaded connection 316 between the first clamp 304 and the elongated member 302.

Now referring to FIG. 3B, another embodiment of a clamping mechanism 350 is shown. In this embodiment, the first clamp 304 is selectively positionable via a series of notches 318 on the elongated member 302, wherein a sliding nut may engage at least one of these notches 318 to apply resistance against the exterior surface 308 of the wall 312. In addition, an internal member 320 is shown, which may retract the portions of the second clamp 306 which protrude from the elongated member 302 such that the elongated member 302 may be inserted through and removed from the hole 314 in the wall 312. Of course, many more embodiments of clamping mechanisms are possible, and these brief descriptions are not meant to be limiting in any way on how the clamping mechanism may look and/or function.

In a further embodiment, described generally with reference to FIGS. 3A-3B an adjustable, spring-loaded clamp may be attached to the member about 3-12 inches from the first end of the member, with an opposite facing adjustable clamp on the member toward the base unit end. The member may be recessed at the area where the spring-loaded clamp exists so that the spring-loaded clamp may be retracted to a diameter less than that of the overall diameter of the member. This allows the spring-loaded clamp to be inserted into and removed from a wall without requiring a hole larger than the diameter of the member. This spring-loaded clamp may be controlled from the base unit so that it will extend two, three, four, or more legs that will catch on the interior of the wall when extended, but will not impede the insertion or removal of the camera end of the member when retracted. The opposite facing adjustable clamp can then be positioned opposite the spring-loaded clamp, with the spring-loaded clamp on the interior of the wall, and the adjustable clamp on the exterior of the wall. This may allow the camera end of the member to be held in place in the hole in the wall by the combination of the two clamps. The spring-loaded and adjustable clamps may be magnetic so that they are attracted to each other through the wall and provide for a positive clamp to hold the camera end of the semi-rigid cable in place during operation, or may be secured through a friction connection, a screw to secure the adjustable clamp on the member, etc.

Figure 4:
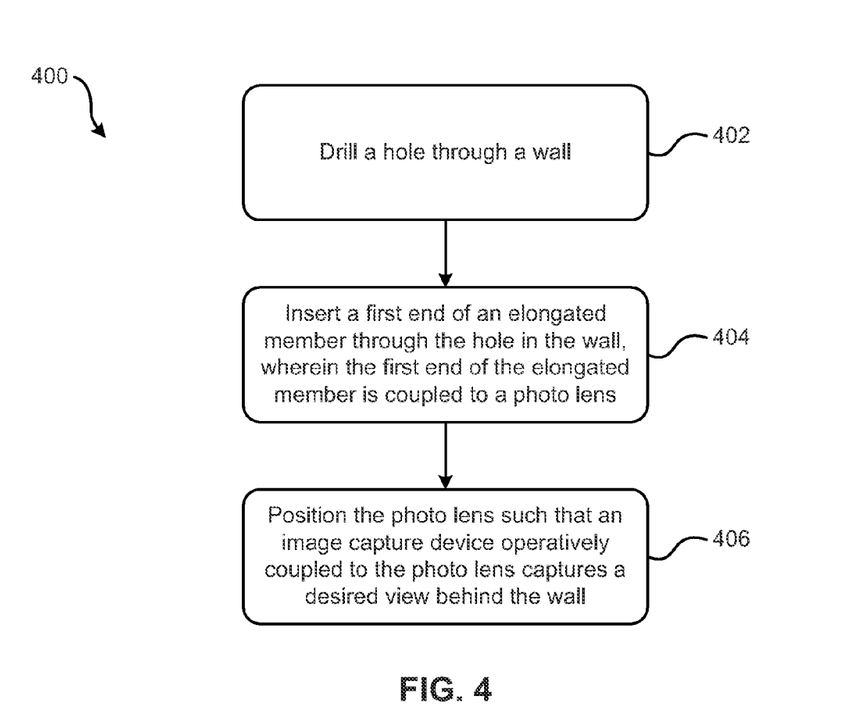
FIG. 4 shows a method for viewing a partially or fully enclosed area according to one embodiment.

Now referring to FIG. 4, a method 400 for viewing a fully or partially enclosed area is described according to one embodiment. The method 400 may be performed in any desired environment, and may be used in conjunction with any of the systems described herein.

In operation 402, a hole is drilled through a wall, such as hole 126 shown in FIG. 1A. Any tool may be used to drill the hole, such as a hand drill, an electric drill, a cordless handheld drill, etc.

In operation 404, a first end of an elongated member is inserted through the hole in the wall, such as that shown in FIG. 1A. In addition, the first end of the elongated member is coupled to a photo lens, similar to that shown in FIG. 1A. Any type of photo lens may be used, such as a standard photo lens, a wide angle lens, an ultra-wide angle lens, such as a fisheye lens, etc. In addition, the elongated member may be inserted manually or automatically through a function of a system.

In operation 406, the photo lens is positioned such that an image capture device operatively coupled to the photo lens captures a desired view behind the wall. This allows a user to observe and view objects from behind the wall which would otherwise be obscured from view without greatly altering or destroying the wall.

In some embodiments, an interior diameter of the hole is about the same as or slightly larger than an exterior diameter of a cross section of the elongated member. For example, if the elongated member is about ½ square inch in cross sectional area at a point passing through the wall, the hole may be drilled such that it has about 0.6 square inch in area, in a similar shape as the elongated member, such that the elongated member may pass through the hole without too much resistance and friction, which might lead to damage to the elongated member, photo lens, or other components of the system. In another example, if the elongated member has a diameter of about inch, the hole may be drilled with a 9/16 inch drill bit to provide some gap around the elongated member upon insertion into the hole.

In some approaches, the elongated member may further comprise at least one of a motor, a flexible portion, a hinge, a joint, and a servomechanism for positioning of at least one of the elongated member and the photo lens. In some further approaches, the method 400 may further comprise positioning at least one of the elongated member and the photo lens using a controller, wherein the controller is coupled to a second end of the elongated member.

According to some preferred embodiments, the elongated member may have a cross sectional area at a point passing through the wall of less than about one square inch.

In some more embodiments, the image capture device may be coupled to the first end of the elongated member. Additionally, the photo lens may be an ultra-wide angle lens, such as a fisheye lens, according to some more embodiments.

In another embodiment, the elongated member further comprises a distance estimating device for estimating a distance from a longitudinal axis of the elongated member to an object in a view of the photo lens.

Figure 5:
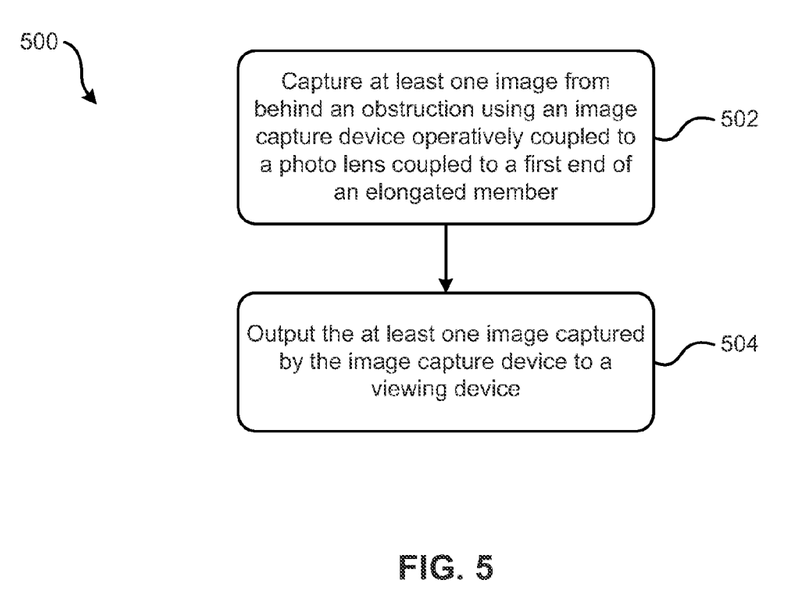
FIG. 5 shows a method for viewing a partially or fully enclosed area according to one embodiment.

Now referring to FIG. 5, a method 500 for viewing a fully or partially enclosed area is shown according to one embodiment. The method 500 may be performed in any desired environment, and may be used in conjunction with any of the systems described herein.

In operation 502, at least one image is captured from behind an obstruction using an image capture device operatively coupled to a photo lens coupled to a first end of an elongated member. For example, as shown in FIG. 1E, a photo lens 132 may be used with an image capture device possibly located near the second end 112 of the elongated member 104, to capture an image taken from behind the wall 128 (an obstruction).

In operation 504, the at least one image captured by the image capture device is output to a viewing device, wherein a center of view of the photo lens is between about 45 degrees and about 135 degrees relative to a longitudinal axis of the elongated member, and wherein the elongated member has a cross sectional area at a point toward the first end of the elongated member of less than about one square inch.

In some approaches, the image capture device may be coupled to a first end of the elongated member, similar to the system shown in FIG. 1E.

In some more approaches, the first end of the elongated member may be inserted through a hole in the obstruction, and the method 500 may further comprise illuminating a view of the photo lens, possibly through the use of a light source, such as light source 118 shown in FIG. 1B.

Further embodiments include various combinations of the features set forth above in various illustrative embodiments and/or shown in the Figures. While various embodiments have been described above, it should be understood that they have been presented by way of example only, and not limitation. Further, particular features described herein can be used in combination with other described features in each and any of the various possible combinations and permutations. Thus, the breadth and scope of a preferred embodiment should not be limited by any of the above-described exemplary embodiments, but should be defined only in accordance with the following claims and their equivalents.

What is claimed is:

1. A system for viewing partially or fully enclosed areas, comprising:
   a camera coupled to a first end of an elongated member;
   at least one interface for communicating with a viewing device; and
   a controller coupled to a second end of the elongated member for controlling at least one of the member, the camera, or the viewing device;
   a light source coupled towards the first end of the elongated member for illuminating a view of the camera;
   wherein the elongated member has a cross sectional area of less than about one square inch at a point toward the first end of the elongated member.

2. A system as recited in claim 1, wherein the elongated member is rotatable about a longitudinal axis thereof relative to the viewing device.

3. A system as recited in claim 1, wherein the controller includes at least one of a control to toggle power to the camera, a control to rotate the elongated member, a control to zoom the camera, and a control to position the member.

4. A system as recited in claim 1, wherein the controller includes a control to toggle power to the light source.

5. A system as recited in claim 1, wherein a center of view of the camera is selectively positionable at an angle of between 0 and about 135 degrees relative to a longitudinal axis of the elongated member.

6. A system as recited in claim 5, wherein the camera is selectively positionable at an angle of between 0 and about 90 degrees relative to the longitudinal axis of the elongated member.

7. A system as recited in claim 1, wherein a center of view of the camera is oriented between about 45 degrees and about 135 degrees relative to a longitudinal axis of the elongated member.

8. A system as recited in claim 1, further comprising storage media operatively coupled to the camera for storing images captured by the camera.

9. A system as recited in claim 1, wherein the elongated member is rigid.

10. A system as recited in claim 1, wherein the elongated member is semi-rigid.

11. A system as recited in claim 1, wherein the elongated member further comprises at least one of a motor, a flexible portion, a hinge, a joint, and a servomechanism for positioning of the elongated member.

12. A system as recited in claim 1, wherein the controller further comprises a connection to a power source.

13. A system as recited in claim 1, further comprising a distance estimating device for estimating a distance from a longitudinal axis of the elongated member to an object in a view of the camera.

14. A system as recited in claim 1, further comprising sending images or video to a remote viewing device.

15. A system as recited in claim 14, wherein the remote viewing device is attached to the controller by at least one of a USB connection, an analog video connection, a WiFi connection, a Bluetooth connection, and a Firewire connection.

16. A system as recited in claim 1, wherein the at least one viewing device includes at least one of an external mobile device, a mobile phone, and a tablet computer.

17. A system as recited in claim 1, wherein the controller is powered by a portable and rechargeable power source.

18. A system as recited in claim 1, wherein the controller is used to control power to the camera or a light source coupled towards the first end of the elongated member for illuminating a view of the camera.

19. The A system as recited in claim 1, wherein the light source includes two or more light-emitting diodes (LED).

20. A system, comprising:
    a photo lens coupled to a first end of an elongated member;
    an image capture device operatively coupled to the photo lens; and
    a viewing device operatively coupled to the image capture device, wherein the viewing device displays an image output, the image output capable of being rotated on the viewing device;
    wherein the elongated member has a cross sectional area of less than about one square inch at a point toward the first end of the elongated member.

21. A system as recited in claim 20, further comprising a light source coupled to the first end of the elongated member for illuminating a view of the photo lens.

22. A system as recited in claim 21, further comprising a controller coupled to a second end of the elongated member for controlling at least one of the light source, the photo lens, the image capture device, and the viewing device.

23. A system as recited in claim 20, wherein the elongated member is rotatable about a longitudinal axis thereof relative to the viewing device.

24. A system as recited in claim 20, further comprising a light guide operatively coupling the image capture device to the photo lens.

25. A system as recited in claim 20, wherein the elongated member further comprises at least one of a motor, a flexible portion, a hinge, a joint, and a servomechanism for positioning at least one of the elongated member, the viewing device, and the photo lens.

26. A system as recited in claim 20, further comprising a distance estimating device for estimating a distance from a longitudinal axis of the elongated member to an object in a view of the photo lens.

27. A method for viewing a fully or partially enclosed area comprising:
    capturing at least one image from behind an obstruction using an image capture device operatively coupled to a photo lens coupled to a first end of an elongated member;
    illuminating a view of the photo lens using a light source;
    outputting the at least one image captured by the image capture device to a viewing device,
    wherein the elongated member has a cross sectional area at a point toward the first end of the elongated member of less than about one square inch.

28. A method as recited in claim 27, wherein the image capture device is coupled to a first end of the elongated member.

29. A method as recited in claim 27, wherein the first end of the elongated member is inserted through a hole in the obstruction.

30. The method as recited in claim 27, wherein a center of view of the photo lens is between about 45 degrees and about 135 degrees relative to a longitudinal axis of the elongated member.

* * * * *